US006913128B2

(12) United States Patent
Müller

(10) Patent No.: US 6,913,128 B2
(45) Date of Patent: Jul. 5, 2005

(54) PISTON-CYLINDER ASSEMBLY HAVING A SPEED-DEPENDENT DAMPING FORCE

(75) Inventor: Thomas Müller, Siershahn (DE)

(73) Assignee: Stabilus GmbH, Koblenz (DE)

( * ) Notice: Subject to any disclaimer, the term of this patent is extended or adjusted under 35 U.S.C. 154(b) by 304 days.

(21) Appl. No.: 10/010,226

(22) Filed: Dec. 6, 2001

(65) Prior Publication Data

US 2002/0074198 A1 Jun. 20, 2002

(30) Foreign Application Priority Data

Dec. 16, 2000 (DE) .......................................... 100 62 987

(51) Int. Cl.⁷ ................................................. F16F 9/34
(52) U.S. Cl. ................ 188/322.15; 188/280; 188/282.8
(58) Field of Search ........................... 188/322.15, 280, 188/281, 282.1, 282.8

(56) References Cited

U.S. PATENT DOCUMENTS

| | | | | |
|---|---|---|---|---|
| 2,458,157 A | * | 1/1949 | Funkhouser ................ | 188/320 |
| 3,066,767 A | * | 12/1962 | Djordjevitch ............... | 188/320 |
| 4,433,759 A | * | 2/1984 | Ichinose ................... | 188/282.8 |
| 4,796,732 A | * | 1/1989 | Kong ..................... | 188/322.15 |
| 4,949,941 A | * | 8/1990 | Bauer et al. ............. | 267/64.12 |
| 5,018,607 A | * | 5/1991 | Hardtke et al. .......... | 188/282.8 |
| 5,137,125 A | * | 8/1992 | Troltsch et al. .......... | 188/282.2 |
| 5,305,860 A | * | 4/1994 | Rotharmel et al. .... | 188/322.15 |
| 5,579,874 A | * | 12/1996 | Jeffries et al. ........... | 188/282.9 |
| 5,730,260 A | | 3/1998 | Thyssen ................... | 188/266.5 |
| 6,085,876 A | * | 7/2000 | Deferme ................ | 188/322.15 |
| 6,247,563 B1 | | 6/2001 | De Carbon et al. | |

FOREIGN PATENT DOCUMENTS

| | | | |
|---|---|---|---|
| DE | 545 334 | 2/1932 | |
| DE | 195 15 368 | 11/1976 | |
| DE | 28 00 630 | 7/1979 | ............. F16F/9/50 |
| DE | 2800630 | * 7/1979 | ............. F16F/9/50 |
| DE | 82 18 079 | 1/1983 | |
| DE | 3329011 | 1/1984 | |
| DE | 88 15 010 | 4/1989 | |
| DE | 93 15 245 | 2/1994 | |
| DE | 43 11 625 | 10/1994 | |
| DE | 295 08 612 | 9/1995 | |
| DE | 195 48 139 | 9/1998 | |
| DE | 198 01 722 | 7/1999 | |
| EP | 0 271 050 | 6/1988 | |
| FR | 844 168 | 7/1939 | |
| FR | 2 730 714 | 8/1996 | |
| JP | 2000145865 | 5/2000 | |

* cited by examiner

*Primary Examiner*—Robert A. Siconolfi
(74) *Attorney, Agent, or Firm*—Cohen, Pontani, Leiberman & Pavane

(57) ABSTRACT

A piston rod is guided in an axially movable manner within a cylinder filled with a damping medium, and a piston is arranged on the piston rod, which piston divides the cylinder into a working space on the piston-rod side and a working space remote from the piston rod. The two working spaces are connected to each other by at least one flow passage which is activated as a function of the axial position of a valve body, which is prestressed in the opening direction by a spring, the valve body being movable onto a valve seat surface into the closed position as a function of dynamic pressure and at least reducing the passage cross section of the at least one flow passage. The piston has a valve seat surface on which the valve body comes to bear with a conical closing surface in the maximally closed position.

14 Claims, 4 Drawing Sheets

PISTON-CYLINDER ASSEMBLY HAVING A SPEED-DEPENDENT DAMPING FORCE

BACKGROUND OF THE INVENTION

1. Field of the Invention

The invention relates to a piston-cylinder assembly having a speed-dependent damping force and including a piston rod axially movable in a cylinder and a piston dividing the cylinder into two working spaces connected by a flow passage which can be closed by a valve body in response to dynamic pressure.

2. Description of the Related Art

DE 198 01 722 discloses a piston-cylinder assembly having a speed-dependent damping force, which assembly has a positionally fixed intermediate washer in which a valve closing as a function of speed is arranged. The valve comprises a valve body having a conical valve surface, the valve body being prestressed in the opening direction by a conical coil spring. This construction has the disadvantage that because of the positionally fixed intermediate washer, there is a stroke loss of the order of magnitude of the axial extent of the working space between the intermediate washer and the separating piston.

DE-C 545 334 describes a hydraulic brake, comprising a piston rod which is guided in an axially movable manner within a cylinder filled with a damping medium, a piston being arranged on the piston rod, which piston divides the cylinder into a working space on the piston-rod side and a working space remote from the piston rod, the two working spaces being connected to each other by at least one flow passage which is activated as a function of the axial position of a valve body, which is prestressed in the opening direction by a spring, the valve body being movable into the closed position as a function of dynamic pressure and at least reducing the passage cross section of the at least one flow passage. The valve body has a planar closing surface which comes to bear on an end surface of the piston. It is not desirable for the piston rod to be blocked, so that any leakage flows between the end surface of the piston and the closing surface of the valve body can be tolerated. There is no reference in this publication to the configuration of a working space.

SUMMARY OF THE INVENTION

The object of the present invention is to realize a piston-cylinder assembly which is constructed such that it is as short as possible and, when the need arises, enables the two working spaces to be completely blocked.

According to the invention, the piston has, on the end side, a valve seat surface on which the valve body comes to bear with a conical closing surface in the maximally closed position.

The conical closing surface makes possible a very reliable sealing function which is retained even if the valve body is slightly askew, since the valve body centers itself on the valve seat surface.

With regard to preventing to the largest possible extent a flow connection between the working spaces separated by the piston, provision is made for the valve body to be guided on a pin, a seal being arranged between the valve body and a guide surface of the pin. The pin can also be formed by a sleeve which is held on the piston rod.

In a further advantageous refinement, the piston has a blind hole opening which accommodates the spring for the valve body, the at least one flow passage extending from a bottom of the blind hole opening. The blind hole opening takes on two functions. Firstly, the spring is guided radially, and, secondly, the blind hole passage can be kept relatively short, with the result that temperature-induced changes in viscosity cause only small fluctuations in the damping force.

In addition, the spring is designed as a conical coil spring, the end of the conical coil spring with the larger coil diameter being arranged at the bottom of the blind hole opening, and the flow passage being formed radially within that end coil of the conical coil spring which is on the bottom side. As a result, very good use is made of the existing structural space.

In order to achieve better sealing of the valve body on the valve seat surface, the valve body is preferably made of plastic. Also, the development of noise at a high closing speed of the valve body is positively influenced on account of the material.

In order to be able to adapt the valve, which moves into the closing position as a function of dynamic pressure, to different applications with the smallest possible outlay, the valve body is prestressed in the opening direction against an axially adjustable stop by the spring.

As a further option, provision can be made for the valve seat surface to be designed such that it can be adjusted axially relative to the piston. This has the effect that, with an otherwise constant prestressing force of the spring acting on the valve body, the closing movement is adjusted independently of the prestressing force of closing the spring.

For this purpose, provision is advantageously made for the valve seat surface to be part of a valve seat ring.

For infinitely variable setting of the closing movement of the piston as a function of the dynamic pressure, the valve seat ring enters into a threaded connection with the piston.

In order to save on the axial overall length which has been required up to now for a working space between the separating washer and the equalizing space, a separating piston is arranged between the piston and that end of the cylinder which is on the piston-rod extension side, said separating piston separating an equalizing space from the working space on the piston-rod side. In the event of blocking, the piston is supported hydraulically on the bottom of the cylinder.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
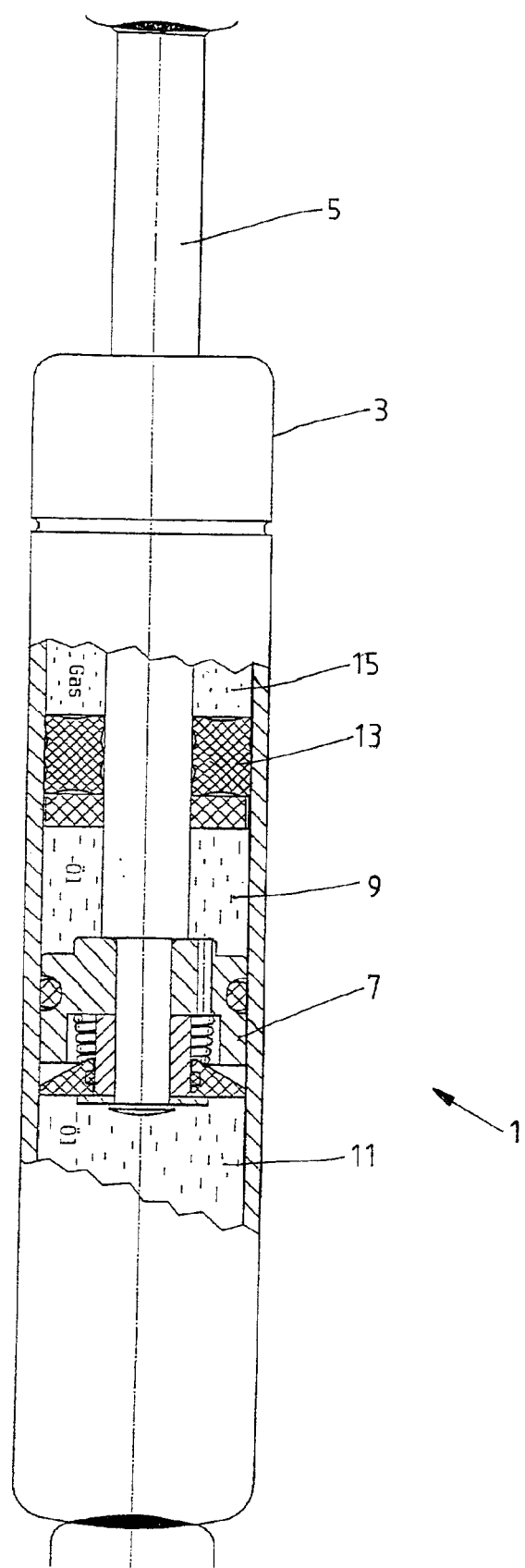
FIG. 1 shows a piston-cylinder assembly together with an illustration of an excerpt.

FIG. 1 shows a piston-cylinder assembly 1 which has a cylinder 3 in which a piston rod 5 is arranged in an axially movable manner. A piston 7, which is connected in a position of a fixed manner to the piston rod, separates the cylinder into a working space 9 on the piston-rod side and a working space 11 remote from the piston rod. The two working spaces are filled with a damping medium, as a rule based on oil. A separating piston 13 separates an equalizing space 15 from the working space 9 on the piston-rod side. The equalizing space is prestressed by a gas, with the result that a pushing-out force always acts on the piston rod. As an alternative, a spring-prestressing means can also be used in the equalizing space.

Figure 2:
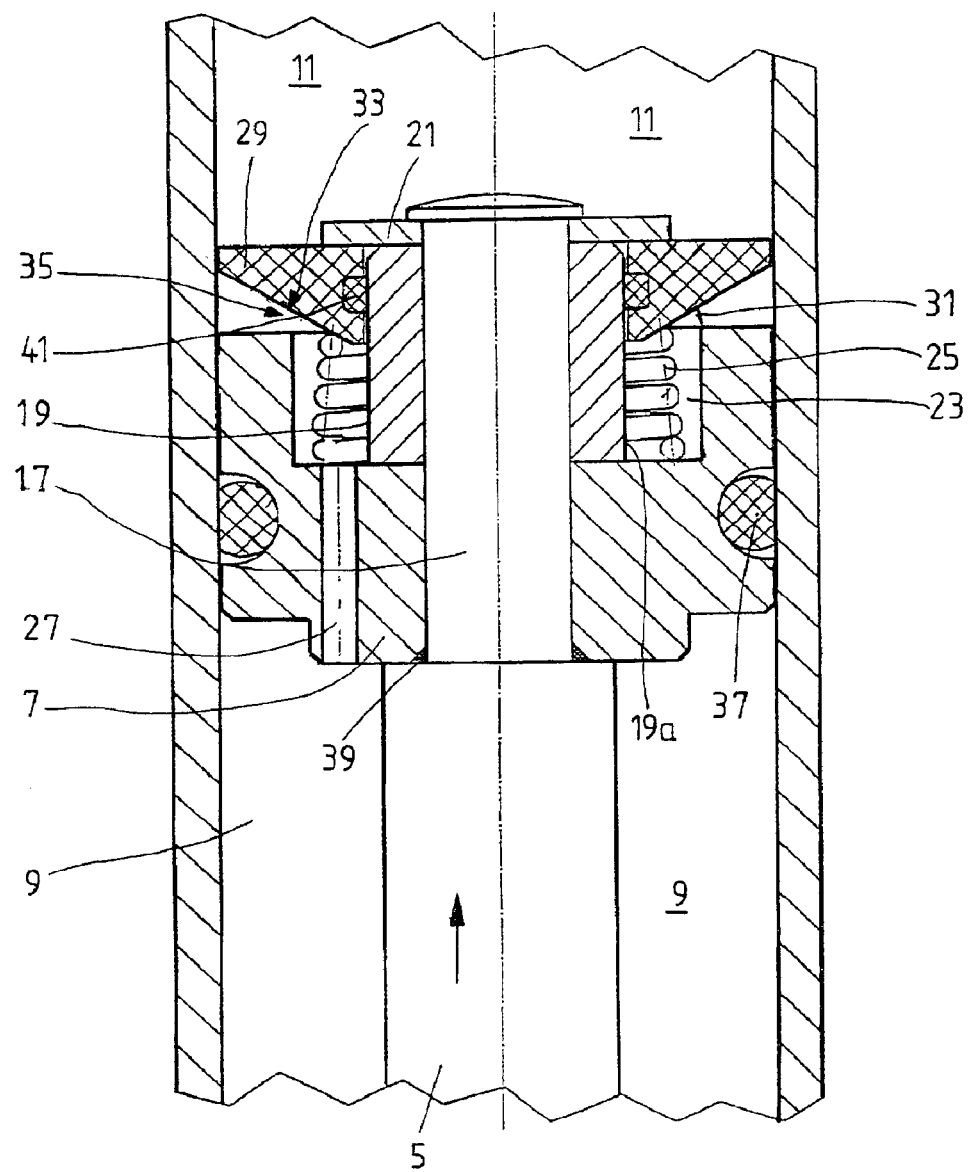
FIGS. 2 and 4 show piston variants according to the invention.
Figure 3:
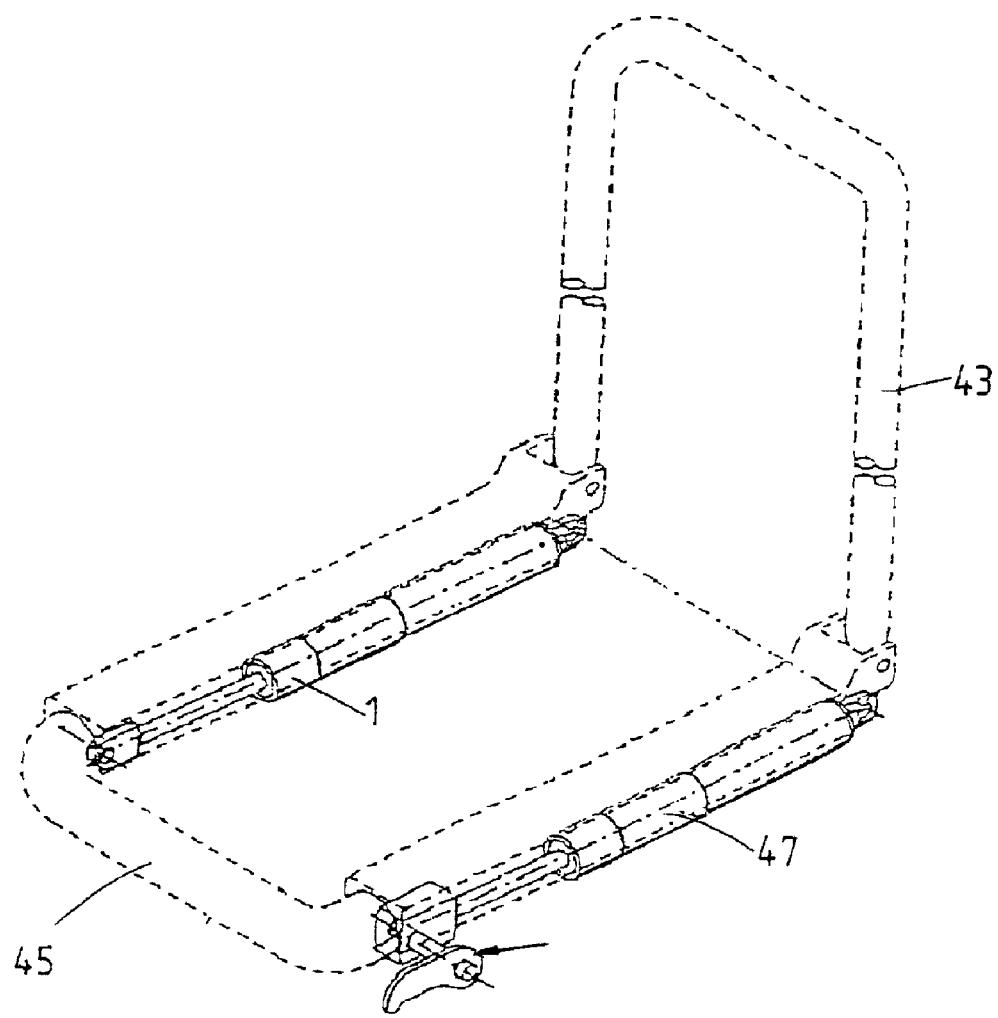
FIG. 3 shows an example of installation of the piston-cylinder assembly.

FIG. 2 illustrates the piston 7 in the version according to FIG. 1 on an enlarged scale. The piston 7 is fixed axially on a pin 17 of the piston rod 5. A guide sleeve 19 in conjunction with a stop washer 21 is braced together with the piston against a shoulder of the piston rod 5. The piston 7 has a blind hole 23 in which a spring 25 is arranged. The blind hole has a flow passage 27 which connects the two working spaces 9; 11 as a function of the operating position of a valve body 29. The valve body 29 which consists of plastic is prestressed in the opening direction against the stop washer 21 y the spring 25. The spring, which is designed as a conical coil spring, is supported on the bottom of the blind hole, the end coil of the conical coil spring running radially outside a graduated circle on which the flow passage 27 is formed. Damping medium can flow into a gap 31 between a conical closing surface 33 of the valve body 29 and an end-side valve seat surface 35 of the piston 7 into the blind hole 23 of the piston and then can continue on into the working space 9 through the at least one flow passage. In the ideal case, the closing surface 33 of the valve body and the valve seat surface 35 have linear contact, with the result that a very reliable sealing function is ensured in conjunction with the valve body which consists of plastic and is therefore elastic within limits. To achieve the linear (essentially one-dimensional) contact, the valve seat surface 35 is an essentially one dimensional circular surface formed at the intersection of the planar end surface of the piston and the cylindrical inside wall of the blind hole 23.

A piston ring 37, an annular seal 39 on the shoulder of the piston rod and a seal 41 on the inside of the valve body 29 to a guide surface 19a of the guide sleeve 19 ensure that no undefined leakage flows between the two working spaces 9,11 occur. The seal 41 permits a somewhat larger guide clearance between the guide surface 19a and the valve body 29. This enables a certain angular mobility of the valve body with respect to the guide surface 19a to be used in order to increase the sealing function of the valve body 29 in interaction with a valve seat surface 35 of the piston 7, which surface might be slightly imprecisely machined.

During a retracting movement of the piston rod 5 into the cylinder 3 in accordance with the arrow direction, a dynamic pressure forms in the working space 11 remote from the piston rod as a function of speed, which dynamic pressure also acts on the valve body 29 in the direction of the valve seat surface 35 of the piston 7. From a certain retracting speed or certain dynamic-pressure force on the valve body 29, the latter moves onto the valve seat surface 35 of the piston 7 and closes the gap 31 between the valve body and the piston. The piston rod is therefore reliably prevented from retracting further.

A function of this type is required, for example, in the case of a vehicle seat which can be adjusted by the piston-cylinder assembly 1. The piston-cylinder assembly 1 is arranged between the backrest 43 and a base part 45. A further piston-cylinder assembly 47 which can be blocked arbitrarily, for example as designed according to DE 40 09 100, is connected in a functionally parallel manner with respect to the piston-cylinder assembly 1. In the event of a very great deceleration, the inertia of a person on a seat acts against the backrest, as a result of which the piston rods of both piston-cylinder assemblies 1; 47 are very rapidly accelerated. Irrespective of the release position of the piston-cylinder assembly 47, the piston-cylinder assembly 1 is brought into the above-described blocking position as a result of the large dynamic pressure in the working space 11.

Figure 4:
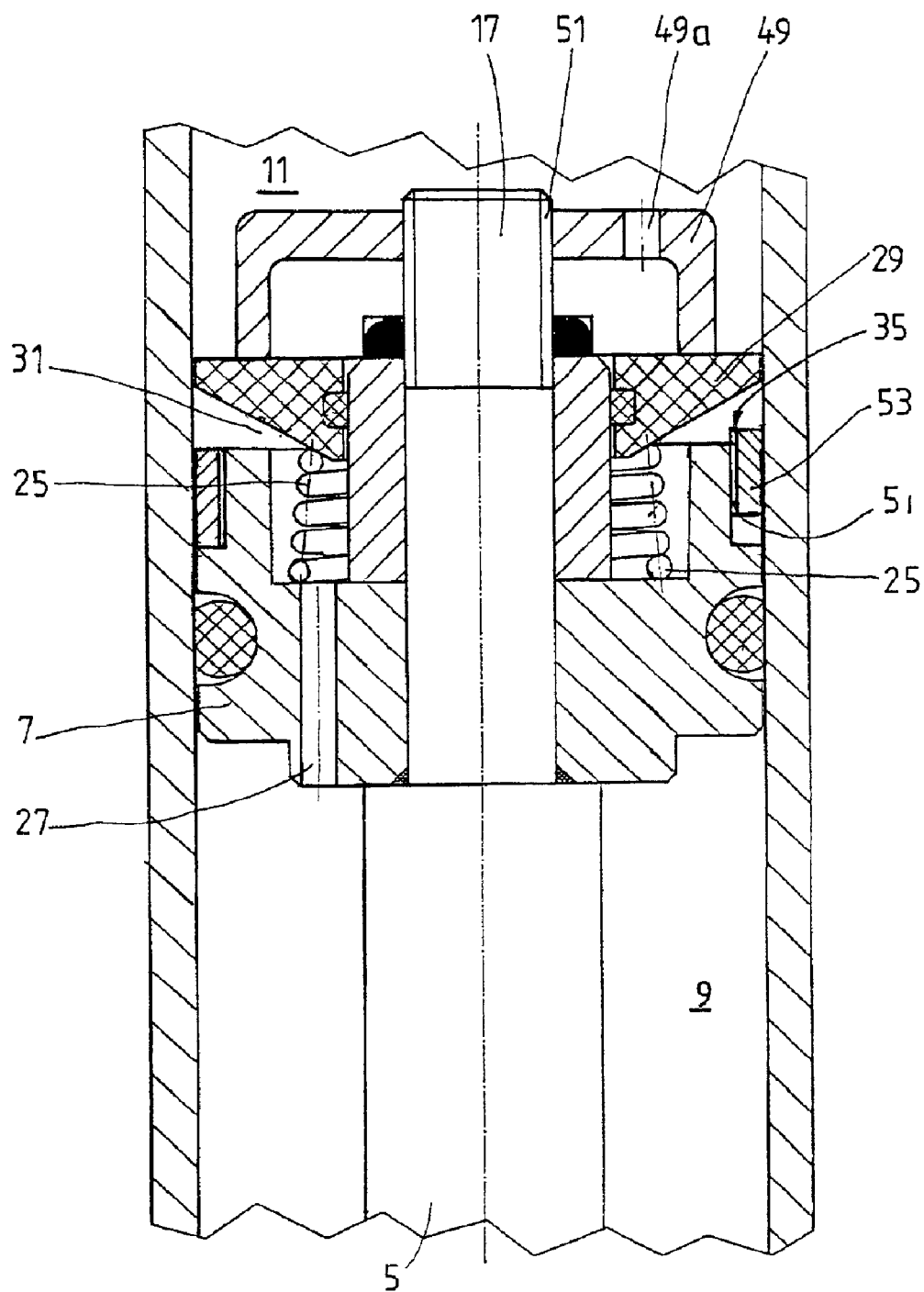

The design of the piston 7 according to FIG. 4 is based on the variant according to FIG. 2. It differs in that an axially adjustable stop 49 is used for the valve body 29, which stop 49 enters into a threaded connection 51 with the pin 17 of the piston rod 7 and can therefore be adjusted in an infinitely variable manner in its position relative to the piston. A passage opening 49a is formed in the stop in order to subject the entire surface facing the working space 11 to the operating pressure in the working space 11. The prestress of the spring 25 is thus changed and the width of the gap 31 is likewise influenced. Adaptation of the closing behavior of the valve body 29 is therefore possible.

As an alternative or in combination, the piston 7 can have an axially adjustable valve seat surface 35 which is formed by a valve seat ring 53. The valve seat ring enters into a threaded connection 54 with the piston and can consequently be adjusted in a likewise infinitely variable manner in order to set the gap 31. In the left half of the section, the valve seat ring is illustrated with the width of the gap open to a maximum, in contrast, in the right half of the section an axial adjustment of the valve seat ring has been undertaken. The substantial functional difference in comparison with the axially adjustable stop 49 is that when the valve seat surface 35 is adjusted, only the width of the gap 31 is changed. The spring force of the spring 25 remains unchanged. The combination of both adjusting options, the spring 25 can be changed in its prestress and therefore in its opening force by the adjustable stop 49, and the adjusting path of the stop can be tracked by the valve seat ring 54, in order to keep the width of the gap 31 constant.

The closing behavior of the valve body 29 is then determined by the spring force of the spring 25, the cross-sectional surface of the gap 31 and the cross-sectional surface of the flow passage 27 independently of the speed of movement of the piston rod.

In both design variants according to FIGS. 2 and 4, in a blocking position of the valve body 29, the piston rod 7 is supported in the working space 11 on a damping-medium column which in turn reaches right to the bottom of the cylinder 3.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A piston-cylinder assembly having a speed-dependent damping force, said assembly comprising
   - a cylinder having an axis,
   - a piston rod which is axially movable in said cylinder,
   - a piston fixed to said piston rod, said piston dividing said cylinder into a working space surrounding said piston rod and a working space remote from said piston rod, said working spaces being filled with a damping medium, said piston having at least one flow passage connecting said working spaces and a circular valve seat surface facing said working space remote from said piston rod, and
   - a valve body which is urged away from said valve seat surface by a spring, said valve body having a conical surface which moves toward said valve seat surface as a function of dynamic pressure of said damping medium on said valve body and bearing against said circular valve seat surface making linear contact in a maximally closed position.

2. A piston-cylinder assembly as in claim 1 further comprising a pin having a guide surface on which said valve body is guided axially, and a seal arranged between the valve body and the guide surface.

3. A piston-cylinder assembly as in claim 1 wherein said piston has a blind hole which accommodates said spring, said blind hole having a bottom from which said at least one flow passage extends.

4. A piston-cylinder assembly as in claim 3 wherein said spring is a conical coil spring having a larger diameter end with an end coil which is arranged on the bottom of the blind hole, said at least one flow passage extending from radially within the end coil.

5. A piston-cylinder assembly as in claim 1 wherein said valve body consists of plastic.

6. A piston-cylinder assembly as in claim 1 further comprising an axially adjustable stop against which the valve body is urged by the spring.

7. A piston-cylinder assembly as in claim 1 wherein said valve seat surface is adjustable to move axially relative to said piston.

8. A piston-cylinder assembly as in claim 7 comprising a valve seat ring, said valve seat surface being located on said valve seat ring.

9. A piston-cylinder-assembly as in claim 8 wherein said valve seat ring has a threaded connection to said piston.

10. A piston-cylinder assembly as in claim 1 further comprising a separating piston arranged on said piston rod and separating the working space surrounding the piston rod from an equalizing space.

11. A piston-cylinder assembly as in claim 2, wherein clearance is provided between the guide surface and the valve body, said clearance providing angular mobility of the valve body with respect to the guide surface.

12. A piston-cylinder assembly as in claim 3, wherein said blind hole has an inside wall which intersects an end surface of said piston to form said circular valve seat.

13. A piston-cylinder assembly as in claim 12, wherein said end surface of said piston is a planar surface.

14. A piston-cylinder assembly as in claim 12, wherein said inside wall is a cylindrical wall.

\* \* \* \* \*